United States Patent [19]

Sato et al.

[11] Patent Number: 5,048,949

[45] Date of Patent: Sep. 17, 1991

[54] LIQUID CRYSTAL PROJECTOR

[75] Inventors: Makoto Sato, Fussa; Tatsuo Shimazaki, Tokyo, both of Japan

[73] Assignee: Casio Computer Co., Ltd., Tokyo, Japan

[21] Appl. No.: 563,936

[22] Filed: Aug. 6, 1990

Related U.S. Application Data

[63] Continuation of Ser. No. 273,909, Nov. 18, 1988, abandoned.

[30] Foreign Application Priority Data

Nov. 26, 1987 [JP] Japan ............................... 62-298640

[51] Int. Cl.⁵ ............................................ G03B 21/28
[52] U.S. Cl. ........................................ 353/77; 353/38; 353/20; 353/122; 358/61; 359/40; 359/63; 359/457
[58] Field of Search ............... 353/77, 78, 122, 30–31, 353/38, 20; 350/330, 331 R, 337, 128; 358/60–61, 231–232

[56] References Cited

U.S. PATENT DOCUMENTS

| | | | |
|---|---|---|---|
| 3,895,866 | 7/1975 | de Quervain et al. | 353/30 |
| 4,060,316 | 11/1977 | Pollack et al. | 353/122 |
| 4,374,609 | 2/1983 | Lange | 350/128 |
| 4,384,768 | 5/1983 | Guzman | 353/38 |
| 4,439,027 | 3/1984 | Shioda et al. | 353/77 |
| 4,497,543 | 2/1985 | Aoki et al. | 350/337 |
| 4,544,946 | 10/1985 | Van Breemen | 358/60 |
| 4,763,993 | 8/1988 | Vogeley et al. | 350/337 |
| 4,796,978 | 1/1989 | Tanaka et al. | 350/337 |
| 4,928,123 | 5/1990 | Takafuji | 353/38 |

FOREIGN PATENT DOCUMENTS 1569680 6/1980 United Kingdom .

Primary Examiner—William A. Cuchlinski, Jr.
Assistant Examiner—William C. Dowling
Attorney, Agent, or Firm—Frishauf, Holtz, Goodman & Woodward

[57] ABSTRACT

A liquid crystal projector includes a liquid crystal panel, a light source for illuminating the liquid crystal panel, a back-projection type screen having on its surface a lenticular lens in which many vertical or horizontal stripe lenses are arranged in parallel, a projection lens for enlargedly projecting light transmitted through the liquid crystal panel onto the back-projection type screen, a light-falling polarized plate arranged between the light-falling plane of the liquid crystal panel and the light source, for transmitting the light from the light source, and oscillating in a predetermined direction, to fall on the liquid crystal panel, and an image-forming polarizing plate arranged between the light-outgoing plane of the liquid crystal panel and the projection lens or in a projection path from the projection lens to the screen, to allow the liquid transmitted through the liquid crystal panel, and oscillating in a predetermined direction, to pass through, thereby forming a light image.

6 Claims, 3 Drawing Sheets

LIQUID CRYSTAL PROJECTOR

This application is a continuation of application Ser. No. 273,909. filed Nov. 18, 1988, now abandoned.

BACKGROUND OF THE INVENTION

1. Field of the Invention

The present invention relates to a liquid crystal projector for projecting images displayed on a liquid crystal display onto a translucent screen.

2. Description of the Related Art

Recently, as a display for a liquid-crystal television receiver using a dot-matrix liquid crystal display having a small screen, liquid crystal projectors have been developed which project displayed images of the liquid crystal display on a large screen so as to enlarge the small images displayed on the liquid crystal display.

In the liquid crystal projectors, light is directed from an illumination lamp to a transmissive dot-matrix liquid crystal display, and light transmitted through the liquid crystal display, which corresponds to a displayed image of the liquid crystal display, is projected on a screen through a projection lens. In general, the liquid crystal display utilizes twisted nematic (TN) liquid crystals.

As is well known, the liquid crystal display utilizing twisted nematic (TN) liquid crystals is formed as follows: the nematic liquid crystals are sealed in, in twisted arrangements of substantially 90 degrees, between a pair of transparent substrates, on the opposed surfaces of which electrodes are formed, to form a TN liquid crystal panel; and a polarizing plate is provided on each of light-falling and light-outgoing planes of the TN liquid crystal panel. The polarizing plate on the light-falling plane of the liquid crystal panel is adapted to allow only light oscillating in a predetermined direction, emitted by the illumination lamp, to enter the liquid crystal panel. The liquid crystals sealed in the liquid panel are twisted with reference to the direction of the axis of passage of light of the light-falling polarizing plate. On the other hand, the polarizing plate on the light-outgoing plane of the liquid crystal panel is adapted to allow the passage of light transmitted through the liquid crystal panel and oscillating in a predetermined direction, thereby forming an optical image. Where the liquid crystal display is of a normally black type in which portions to which an electric field is applied can transmit light, while portions to which no electric field is applied interrupt light so as to display images, the axis of passage of light of the image-forming polarizing plate on the light-outgoing plane is made parallel to that of the polarizing plate on the light-falling plane. On the other hand, in the case of a normally white type in which portions to which an electric field is applied interrupt light, while portions to which no electric field is applied can transmit light, the image-forming polarizing plate has its axis of passage of light made substantially normal to that of the light-falling polarizing plate.

The conventional liquid crystal display uses, as the TN type liquid crystal display, one used in a direct-vision type display in which the light-outgoing plane is observed directly. In the TN type liquid crystal display used in the direct-vision type display, the light-falling polarizing plate and the image-forming polarizing plate on the light-outgoing plane have their axes of passage of light arranged to make an angle of about 45 degrees with upper and lower edges of the screen of the liquid crystal panel. With the TN type liquid crystal display having the polarizing plates whose axes of passage of light set as described above, the viewing direction in which the displayed images can be watched most clearly is slightly tilted from the direction normal to the screen toward the lower edge of the screen.

The liquid crystal displays are classified into a type in which images projected on a screen are observed from the projection side and a type in which a translucent back-projection type screen is used, and images projected on the screen from the back side thereof are observed from the front side thereof. In the back-projection type liquid crystal projector using the back-projection type screen, in order to widen a viewing angle for the images projected on the screen, a lenticular lens, in which many minute lenses are arranged in the form of stripes, is attached to a surface of the screen to diffuse light transmitted to the surface of the screen.

The lenticular lens is adapted to widen the viewing angle for projected images by the use of light diffusion function of each stripe lens in the direction of width thereof. Hence, the projected image seen on the screen on which the lenticular lens is attached is slightly extended in the direction in which the viewing angle is widened. If stripe lenses of the lenticular lens are formed vertically or horizontally, then the projected images will be observed without being distorted unnaturally. In general, the stripe lenses are formed vertically to widen the viewing angle horizontally. In the case of the horizontal stripe lenses, the viewing angle will be widened vertically.

As described above, the conventional back-projection type liquid crystal projector uses a direct-vision type liquid crystal display in which the light-falling polarizing plate and the image-forming polarizing plate on the light-outgoing plane have their axes of passage of light arranged to make an angle of about 45 degrees with upper and lower edges of the liquid crystal panel. Therefore, the image light projected on the back-projection type screen, on a surface of which the lenticular lens having vertical or horizontal stripe lenses is parallel formed, oscillates in the direction displaced by about 45 degrees from the direction of width of each stripe lens of the lenticular lens. This results in poor light transmittance of the screen and thus production of dark images on the viewing surface of the screen. This is due to the surface reflection of the lenticular lens.

The reflectance of incident light on the surface of each stripe lens of the lenticular lens is smallest when the incident light is so called P polarized light oscillating in the direction of width of the stripe lens. In the conventional back-projection type liquid crystal projector, the incident light on the back projection type screen strongly polarizes in the direction of about 45 degrees relative to the direction of width of each stripe lens of the lenticular lens. Hence, the surface reflectance of the lenticular lens becomes large and the light transmittance is thus reduced correspondingly. Consequently, the brightness of images seen on the screen reduces.

If each stripe lens of the lenticular lens were slanted by about 45 degrees with respect to the upper and lower edges of the screen, then the direction of width of the stripe lens could be suited to the oscillating direction of the incident light on the screen so as to increase the light transmittance. However, this would stretch the projected images on the slant and thus result in unnaturally distorted images.

It is accordingly an object of the present invention to provide a back-projection type display which, in spite of the use of a back-projection type screen on which a lenticular lens in which many vertical or horizontal stripe lenses are arranged in parallel is formed, makes it possible to see highly bright projected images on the viewing surface of the screen.

SUMMARY OF THE INVENTION

To attain the object, the liquid crystal projector comprises: a liquid crystal panel having a light-falling plane and a light-outgoing plane; a light source for illuminating the liquid crystal panel; a light-transmissive back-projection type screen on a surface of which a lenticular lens is formed in which a great number of stripe lenses are arranged in parallel; a projection lens for enlargedly projecting light transmitted through the liquid crystal panel on the back-projection type screen; an image-forming polarizing plate disposed between the light-outgoing plane of the liquid crystal panel and the projection lens or in a projection path from the projection lens to the screen and having an axis of passage of light which is substantially normal to the direction of length of the stripe lenses of the lenticular lens, for allowing light transmitted through the liquid crystal panel and oscillating in a predetermined direction to pass through to form a light image; and a light-falling polarizing plate disposed between the light-falling plane of the liquid crystal panel and the light source and having an axis of passage of light which is substantially parallel to or normal to that of the image-forming polarizing plate, for allowing light from the light source, which oscillates in a predetermined direction, to pass through.

That is, according to the liquid crystal projector of the present invention, the axis of passage of light of the image-forming polarizing plate, adapted to form a light image by allowing the passage of the light transmitted through the liquid crystal panel and oscillating in a predetermined direction, is made substantially normal to the direction of length of the stripe lenses of the lenticular lens on the surface of the screen. The axis of passage of light of the light-falling polarizing plate disposed between the light-falling plane of the liquid crystal panel and the light source is made parallel to (in the case where normally black images are displayed) or substantially normal to (in the case where normally white images are displayed) that of the image-forming polarizing plate. The liquid crystal display is thus formed of the light-falling polarizing plate, the liquid crystal panel and the image-forming polarizing plate. The displayed images on the liquid crystal display are projected on the back-projection type screen.

According to the liquid crystal projector of the present invention, since the axis of passage of light of the image-forming polarizing plate is set as described above, the light projected on the back-projection type screen from its back side falls on the screen as the P polarized light oscillating in the direction of width of the stripe lenses of the lenticular lens and having the smallest surface reflectance. Therefore, in spite of the use of the back-projection type screen having the lenticular lens formed thereon with the vertical or horizontal stripe lenses arranged in parallel, the transmittance of light of the back-projection type screen can be made high and thus highly bright projected images can be displayed on the screen.

DETAILED DESCRIPTION OF PREFERRED EMBODIMENT

Figure 1:
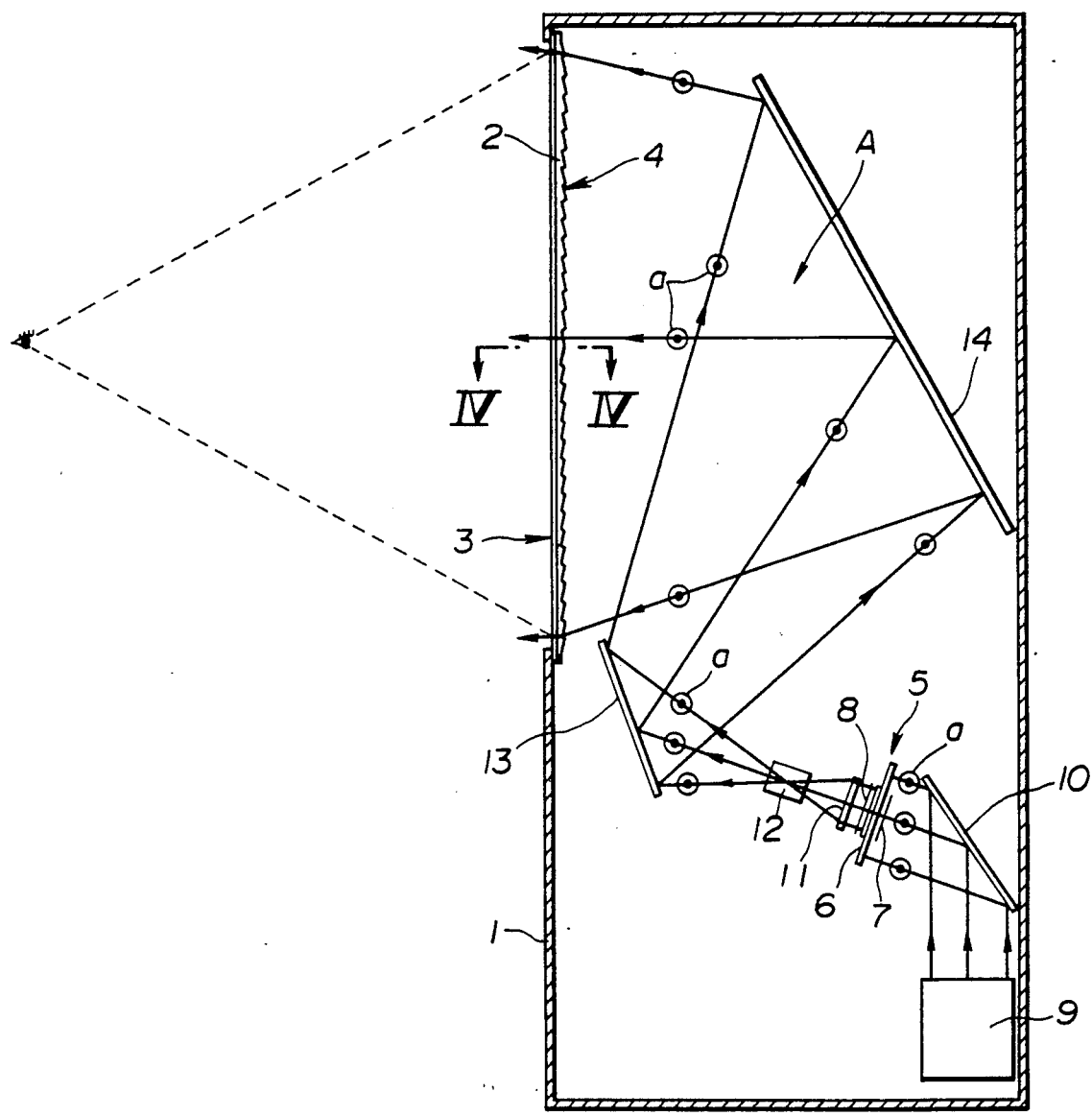
FIG. 1 is a vertical sectional side view of a liquid crystal projector embodying the present invention.
Figure 2A:
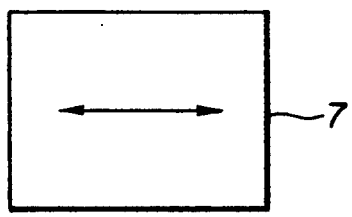
FIGS. 2(a) through 2(d) show the oscillation direction of light passing through a light-incident polarizing plate, the oscillation directions of incident light and outgoing light to and from an liquid crystal panel, and the oscillation direction of light passing through an image-forming polarizing plate.
Figure 2B:
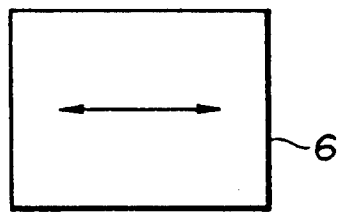
Figure 2C:
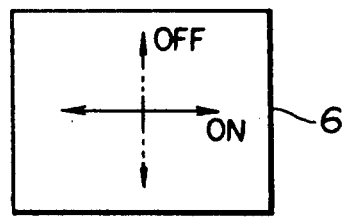
Figure 2D:
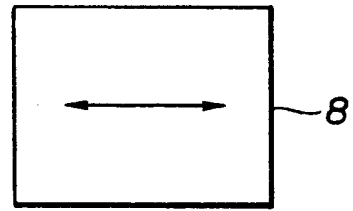

Referring now to FIG. 1, a projector housing 1 is formed into the shape of a box which is provided, at the upper half thereof, with a large display window of a rectangular shape which is long from side to side. A translucent back projection type screen 2 is attached to the display window. As partly enlarged in FIGS. 4 and 5, back-projection type screen 2 is formed of a transparent thin plate made of acrylic resin, a lenticular lens 3, which has many minute stripe lenses 3a arranged in parallel, formed on the surface (outer surface) of the transparent thin plate and a circular Fresnel lens 4 formed on the rear surface (inner surface) of the transparent thin plate. Circular Fresnel lens 4 is adapted to cause projection light to fall on the screen substantially perpendicularly. In this embodiment, stripe lenses 3a of lenticular lens 3 are formed vertically.

Returning to FIG. 1, a transmissive dot-matrix liquid crystal display 5 for displaying television pictures is placed in the lower part of housing 1. Liquid crystal display 5 is of a TN type comprised of a TN type liquid crystal panel 6 in which nematic liquid crystals twisted by about 90 degrees is sealed in between a pair of transparent substrates on the opposed surfaces of which electrodes are formed, and a pair of polarizing plates 7 and 8 disposed on the light-falling and light-outgoing planes of liquid crystal panel 6. Liquid crystal panel 6 is illuminated by a light source 9 which, though not shown, comprises a high intensity lamp such as a halogen lamp or xenon lamp, and a parabolic reflector to reflect emitted light from the lamp in the form of parallel rays of light. Light source 9 is placed in a position to illuminate liquid crystal display 5 through a mirror 10 made of a cold mirror.

The reflection of the illumination light emitted by light source 9 from mirror 10 to liquid crystal display 5 is intended to decrease the entire depth of the projector as compared to the case where the light source is placed to face liquid crystal display 5 directly, while ensuring a sufficient optical path length from light source 9 to liquid crystal display 5. Here it is to be noted that light source 9 should sufficiently be distant from liquid crystal display 5 so that the crystals within liquid crystal panel 6 may not be affected by radiant heat from light source 9.

Polarizing plate 8 on the light-outgoing surface of TN liquid crystal panel 6 is adapted to a image-forming polarizer which transmits only the light that oscillates in a predetermined direction, of light transmitted through liquid crystal panel 6. The axis of passage of light of image-forming polarizer 8 is formed in the direction (i.e. horizontally) substantially normal to the lengthwise direction of vertical stripe lenses 3a of lenticular lens 3 formed on the surface of back-projection type screen 2.

Light-falling polarizing plate 7 disposed on the light-falling plane of TN liquid crystal panel 6 is adapted to transmit only the light that oscillates in a predetermined direction, of the illumination light directed thereto from light source 9 via mirror 10, to liquid crystal panel 6. In this embodiment, light-falling polarizing plate 7 is so arranged that its axis of passage of light is parallel (horizontal) to that of image-forming polarizing plate 8, and the crystals within liquid crystal panel 6 are twisted with reference to the axis of passage of light of light-falling polarizing plate 7 (the orientation of the liquid crystal molecules at the surface of the light-falling substrate is parallel to the axis of passage of light of light-falling polarizing plate 7). As a result, liquid crystal display 5 operates to display normally black images.

That is, FIGS. 2(a) through 2(d) show the oscillation direction of light passing through light-falling polarizing plate 7, the oscillation directions of incident light and outgoing light to and from liquid crystal panel 6, and the oscillation direction of light passing through image-forming polarizing plate 8. When an electric field is applied (ON time), as shown by a solid arrow in FIG. 2(c), light transmitted through TN liquid crystal panel 6 passes through image-forming polarizing plate 8 as light oscillating in the same direction as the incident light. When no electric field is applied (OFF time), on the other hand, as shown by a broken arrow in FIG. 2(c), the light transmitted through liquid crystal panel 6 undergoes rotatory polarization of substantially 90 degrees relative to the oscillation direction of the incident light and is thus interrupted by image-forming polarization plate 8.

When, as described above, the light from light source 9 falls on liquid crystal display 5 through mirror 10, the reflectance of light fallen on the mirror plane on the slant differs with oscillation directions of the incident light. The reflectance of the light oscillating in the direction normal to a plane (the plane of the sheet of FIG. 1) which is parallel to the optical axis of the incident light and normal to the mirror plane, i.e., the S polarized light is highest. Hence, when the axis of passage of light of light-falling polarizing plate 7 is made horizontal as described above, mirror 10 is disposed such that it is parallel to the axis of passage of light of light-falling polarizing plate 7 and slanted by a predetermined angle relative to the direction normal to the axis of passage of light of light-falling polarizing plate 7, and light source 9 is disposed to face mirror 10 as shown. Such a disposition of mirror 10 will avoid the loss of light due to the disposition of mirror 10 on the side of the light source 9 because the light oscillating in the direction to provide the highest reflectance, of light reflected from mirror 10, passes through light-falling polarizing plate 7.

In addition, referring to FIG. 1, a condenser lens 11 consisting of a circular Fresnel lens is disposed in front of liquid crystal display 5, or on the light-outgoing side thereof, and a projection lens 12 is disposed in front of condenser lens 11. The light allowed to pass through liquid crystal display 5, namely the light corresponding to the displayed image on liquid crystal display 5 is condensed by condenser lens 11 to projection lens 12 and then enlargedly projected by projection lens 12 on back-projection type screen 2 from the back side thereof through a projection path A provided with first and second projection mirrors 13 and 14. Of projection mirrors 13 and 14 constituting the projection path A, the second projection mirror 14 approximates in area to screen 2 and is disposed in the rear of housing 1 to face the rear surface of screen 2. On the other hand, first projection mirror 13 is situated in the front of housing 1 and beneath screen 2 so as to face second projection mirror 14. These projection mirrors 13 and 14 are placed parallel to the direction of width of vertical stripe lenses 3a of lenticular lens 3 on the surface of screen 2 and slanted relative to the direction of length of vertical stripe lenses 3a. More specifically, first projection mirror 13 is slanted upward, while second projection mirror 14 is slanted downward.

Liquid crystal display 5 and projection lens 12 are disposed, as shown in FIG. 1, to face first projection mirror 13, while light source 9 and mirror 10 are disposed in accordance with the disposition of liquid crystal display 5. The image light transmitted through liquid crystal display 5 and projected by projection lens 12 is reflected by first projection mirror 13 to second projection mirror 14 and then reflected by second projection mirror 14 to screen 2. As described above, as projection path A from projection lens 12 to screen 2, a bent path is used to project the image light on screen 2 through the reflection from projection mirrors 13 and 14. This is intended to decrease the spacing between screen 2 and projection lens 12 and hence the entire depth of the projector.

Figure 4:
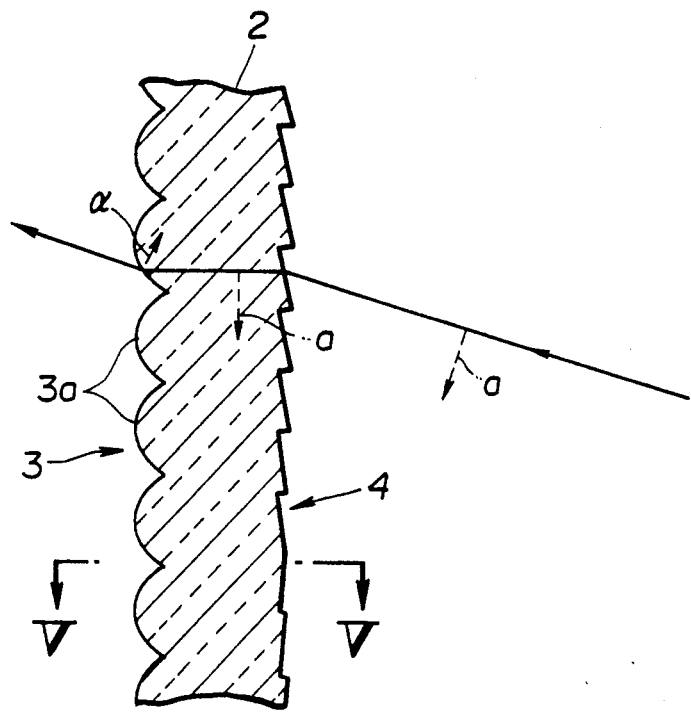
FIG. 4 is an enlarged sectional view taken along line IV—IV of FIG. 1.
Figure 5:
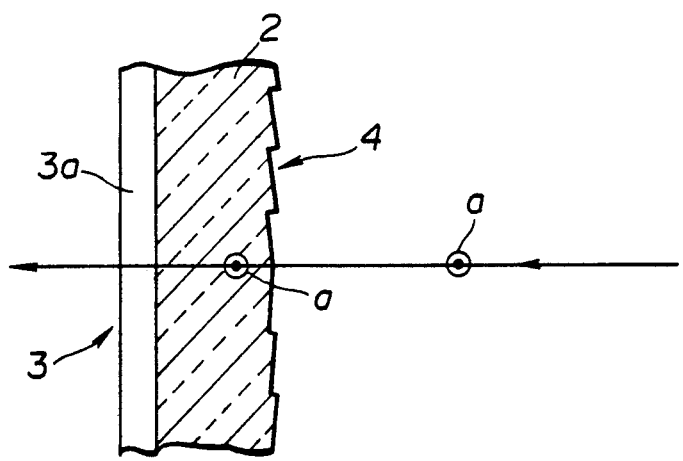
FIG. 5 is a sectional view taken along line V—V of FIG. 4.

That is to say, the liquid crystal projector embodying the present invention is summarized as follows. The axis of passage of light of image-forming polarizing plate 8, adapted to form a light image by allowing the passage of the light transmitted through TN liquid crystal panel 6 and oscillating in a predetermined direction, is made substantially normal (horizontal) to the direction of length (vertical) of vertical stripe lenses 3a of lenticular lens 3 on the surface of screen 2. The axis of passage of light of light-falling polarizing plate 7 of liquid crystal panel 6 is made parallel to that of image-forming polarizing plate 8. The liquid crystals are twisted within liquid crystal panel 6 with reference to the axis of passage of light of light-falling polarizing plate 7. TN liquid crystal display 5 for displaying normally black images is thus formed of light-falling polarizing plate 7, TN liquid crystal panel 6 and image-forming polarizing plate 8. The displayed images on liquid crystal display 5 is projected on back-projection type screen 2 by projection lens 12 via projection path A provided with projection mirrors 13 and 14. As shown in FIGS. 4 and 5, the image light projected on back-projection type screen 2 from its back side is made to perpendicularly fall on the screen by means of circular Fresnel lens 4 on the rear side of the screen and diffused by means of stripe lenses 3a of lenticular lens 3 on the screen surface in the direction of their width to go out of the screen. In FIGS. 4 and 5, a represents the direction in which light oscillates.

Figure 3:
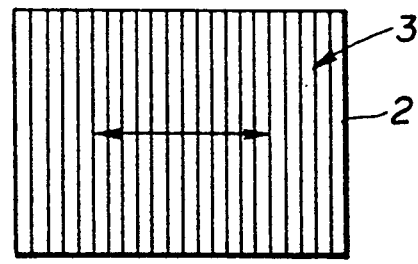
FIG. 3 shows the oscillation direction of light falling on a projection screen.

According to the liquid crystal projector, since the axis of passage of light of image-forming polarizing plate 8 is set as described above, the image light projected on back-projection type screen 2 from its back side falls on the screen as the light oscillating in the direction of width of stripe lenses 3a of lenticular lens 3, as shown in FIG. 3. In addition, being disposed parallel to the direction of width of stripe lenses 3a of lenticular lens 3 on the screen surface and slantly relative to the direction of length of stripe lenses 3a of lenticular lens 3, projection mirrors 13, 14 forming projection path A can reflect the light oscillating in the direction of width of stripe lenses 3a of lenticular lens 3 at the highest reflectance. The oscillator direction of this light is the same as that of light transmitted through image-forming polarizing plate 8, and hence projection mirrors 13, 14 can efficiently reflect the light transmitted through image-forming polarizing plate 8 and projected by projection lens 12 toward screen 2. The light falls on the screen as the P polarized light oscillating in the direction of width of stripe lenses 3a of lenticular lens 3 and having the smallest surface reflectance. Consequently, light α (see FIG. 4) reflected at the surface of lenticular lens 3 is virtually negligibly small in amount. Therefore, in spite of the use of back-projection type screen 2 having lenticular lens 3 formed thereon with vertical stripe lenses 3a arranged in parallel, the liquid crystal projector described above can make the transmittance of light passing through back-projection type screen 2 high and thus provide highly bright projected images on the screen.

In the above embodiment, the TN liquid crystal panel 6 in which the orientation of the liquid crystals is twisted by 90 degrees is used. Alternatively, a STN type of TN liquid crystal panel may be used in which the liquid crystals are twisted by 180–270 degrees, for example. In the above embodiment, although stripe lenses 3a of lenticular lens 3 are formed vertically, they may be formed horizontally. In this case, it is only required that the axis of passage of light of image-forming polarizing plate 8 be set vertically, and the axis of polarization of light-falling polarizing plate 7 be determined accordingly.

Moreover, in the above embodiment, the description is made of the case where normally black images (black and white images or full-color images) are projected on the screen. Alternatively, normally white images may be projected on the screen. In this case, it is required that: the axis of passage of light of light-falling polarizing plate 7 be made substantially normal to that of image-forming polarizing plate 8; the liquid crystals within liquid crystal panel 6 be twisted with reference to the axis of passage of light of light-falling polarizing plate 7; mirror 10 on the side of the light source be disposed to reflect the light oscillating in the same direction as the axis of passage of light of light-falling polarizing plate 7 at the highest reflectance; and light source 9 be disposed to face the mirror.

Furthermore, in the above embodiment, light-falling polarizing plate 7 is disposed on the light-falling surface of liquid crystal panel 6. Alternatively, light-falling polarizing plate 7 may be disposed at any position between the light-falling surface of liquid crystal panel 6 and light source 9. Image-forming polarizing plate 8 may also be disposed between the light-outgoing plane of liquid crystal panel 6 and projection lens 12 or at any position in projection path A from projection lens 12 to screen 2, e.g., the rear surface of screen 2. Further, projection path A from projection lens 12 to screen 2 may be a linear path having no projection mirrors.

In the above embodiment, back-projection type screen 2 is disposed on the front surface of display housing 1. The present invention may be applied to a liquid crystal projector in which the back-projection type screen 2 is disposed in front of the display housing. The liquid crystal display panel 6 may display not only television broadcast pictures but also images produced by word processors and computers.

What is claimed is:
1. A liquid crystal projector comprising:
a liquid crystal display panel;
a light source for illuminating said display panel;
a translucent back-projection type screen on a surface of which is formed a lenticular lens comprising a large number of stripe lenses arranged substantially in parallel;
projection means for projecting light supplied from said display panel onto said screen;
oscillating direction control means for causing the light transmitted through said display panel to be incident upon said screen in a direction of oscillation substantially perpendicular to the direction of length of said stripe lenses;
at least one mirror arranged between said projection means and said screen; and
means for causing S polarized light to be incident upon said at least one mirror.

2. A liquid crystal projector comprising:
a liquid crystal display panel;
a light source for illuminating said display panel;
a translucent back-projection type screen on a surface of which is formed a lenticular lens comprising a large number of stripe lenses arranged substantially in parallel;
a projection lens for projecting light supplied from said display panel onto said screen;
at least one mirror arranged between said projection lens and said screen; and
means for causing S polarized light to be incident upon said at least one mirror and for causing the light as reflected by said at least one mirror to be incident upon said screen in a direction of oscillation substantially perpendicular to the direction of the length of said stripe lenses.

3. A liquid crystal projector comprising:
liquid crystal display means;
a light source for illuminating said display means;
a translucent back-projection type screen on a surface of which is formed a lenticular lens comprising a large number of stripe lenses arranged substantially in parallel;
projection means for projecting light passing through said display means onto said screen; and
oscillating direction control means for receiving S polarized light from said projection means and for causing the light as received to be incident upon said screen in a direction of oscillation substantially perpendicular to the direction of length of said stripe lenses.

4. A liquid crystal projector according to claim 3, wherein said display means includes at least one polarizing plate for causing S polarized light to be incident upon said control means.

5. A liquid crystal projector comprising:
liquid crystal display means for displaying an image;
a light source for illuminating said display means;
a translucent back-projection type screen on a surface of which is formed a lenticular lens comprising a large number of stripe lenses arranged substantially in parallel;
projection means for projecting light supplied from said display means onto said screen;
oscillating direction control means for causing the light transmitted through said display means to be incident upon said screen in a direction of oscillation substantially perpendicular to the direction of length of said stripe lenses;
at least one mirror arranged between said projection means and said screen; and means for causing S polarized light to be incident upon said at least one mirror.

6. A liquid crystal projector comprising:

a liquid crystal display means for displaying an image;

a light source for illuminating said display means;

a translucent back-projection type screen on a surface of which is formed a lenticular lens comprising a large number of stripe lenses arranged substantially in parallel;

projecting means for projecting light supplied from said display means onto said screen;

at least one mirror arranged between said projecting means and said screen; and means for causing S polarized light to be incident upon said at least one mirror and for causing the light as reflected by said at least one mirror to be incident upon said screen in a direction of oscillation substantially perpendicular to the direction of the length of said stripe lenses.

* * * * *